United States Patent [19]

Carson et al.

[11] Patent Number: 5,662,023

[45] Date of Patent: Sep. 2, 1997

[54] REPLACEABLE CYLINDER PISTON ASSEMBLY FOR A LUBRICATOR PUMP

[75] Inventors: Richard L. Carson; Kenneth Farroni, both of Houston, Tex.

[73] Assignee: Premier Lubrication Systems, Inc., Houston, Tex.

[21] Appl. No.: 529,277

[22] Filed: Sep. 15, 1995

[51] Int. Cl.$^6$ ............................................ F01B 29/04
[52] U.S. Cl. ...................... 92/59; 92/128; 92/169.1; 184/7.4; 417/490; 417/454
[58] Field of Search ................... 92/59, 169.1, 128; 417/454, 490, 569; 184/7.4

[56] References Cited

U.S. PATENT DOCUMENTS

| | | | |
|---|---|---|---|
| 767,526 | 8/1904 | Paulson | 92/59 |
| 1,976,151 | 10/1934 | Thaheld | 417/454 |
| 2,285,730 | 6/1942 | Lindeman, Jr. | 417/454 |
| 2,374,867 | 5/1945 | Knapp | 417/454 |
| 2,792,911 | 5/1957 | Harter | 184/7.4 |
| 3,074,509 | 1/1963 | Robson . | |
| 3,153,385 | 10/1964 | Le Baron Bowen, Jr. . | |
| 3,219,146 | 11/1965 | Leese et al. . | |
| 3,291,350 | 12/1966 | Malec . | |
| 3,298,460 | 1/1967 | Porter et al. . | |
| 3,330,217 | 7/1967 | Baur et al. | 416/454 |
| 3,371,745 | 3/1968 | Callahan et al. . | |
| 3,409,104 | 11/1968 | Acker et al. . | |
| 3,476,214 | 11/1969 | Callahan . | |
| 3,653,466 | 4/1972 | Fujita et al. . | |
| 3,682,572 | 8/1972 | Yarger | 417/454 |
| 3,754,479 | 8/1973 | Elser . | |
| 3,901,313 | 8/1975 | Doniguian et al. | 166/64 |
| 3,921,760 | 11/1975 | Brownrigg . | |
| 4,087,213 | 5/1978 | Hadama | 417/454 |
| 4,105,094 | 8/1978 | Callahan . | |
| 4,186,821 | 2/1980 | Wegmann . | |
| 4,312,425 | 1/1982 | Snow et al. . | |
| 4,893,738 | 1/1990 | Gelinas . | |
| 5,456,583 | 10/1995 | Handzel | 417/454 |

OTHER PUBLICATIONS

Flyer entitled "Premier" for prior art pump for Premier Lubrication Systems (2 pages).
Prior art pump, as shown in FIG. 4 of the present application, with the cylinder integral with the pump housing (Box A). Commercial embodiment of the present invention with interchangeable cylinders with piston of different sizes (Box B).
Libriquip® Centralized Lubrication Systems, Manzel® Model 88 Pump, Bulletin 51025, ©Lubriquip, Inc., A Unit of IDEX Corporation Dec. 1989 (3 pages total).
Model 55 Lubricator Pumps and Check Valves published by Lincoln Industrial of St. Louis, MO, Form 11320 Printed in USA Mar. 1985 (3 pages total).
Lincoln Model 55i Revolution: published by Lincoln, A Pentair Company of St. Louis, MO, Form 442012 Printed U.S.A. Copyright 1993 (2 pages total).
Bulletin 675 published by McCord Lubrication Systems Division, Revised Aug. 1970, front and back (1 page total).

Primary Examiner—Thomas E. Denion
Attorney, Agent, or Firm—Pravel, Hewitt, Kimball & Krieger

[57] ABSTRACT

A lubricator pump having a replaceable cylinder piston assembly is disclosed for replacement or interchangeability with cylinders having different piston sizes. The interchangeability of the cylinder piston assembly allows for different lubricant output.

18 Claims, 3 Drawing Sheets

5,662,023

REPLACEABLE CYLINDER PISTON ASSEMBLY FOR A LUBRICATOR PUMP

FIELD OF THE INVENTION

This invention generally relates to lubricators for machinery. More particularly, this invention relates to a lubricator pump having a replaceable cylinder piston assembly.

BACKGROUND OF THE INVENTION

Lubricators have been used in the past for pumping predetermined quantities of mineral or synthetic oil or lubricant to machinery injection points. These lubricators deliver this predetermined quantity of lubricant normally under pressure and at regular intervals.

The lubricator generally comprises a reservoir, pumps and drive mechanism that can be either electric motor drive or shaft driven from the machinery to be lubricated. These lubricators have been used with rubber machinery, food process machinery, reciprocating air compressors, reciprocating gas compressors, reciprocating pumps, engines and other similar machinery.

The lubricator pumps are actuated by a central cam shaft attached to the drive mechanism to move the respective pump pistons. However, in the past the cylinder surrounding the pump piston has been integral with the pump housing, such as shown in the prior art device of FIG. 4 manufactured by the assignee of the present invention. Assignee's device in FIG. 4 is rated for a ¼ inch piston for pumping up to 6000 psi (0.018 inch$^3$ per stroke max).

An example of another lubricator pump is the "Manzel" model 88 pump manufactured by Lubriquip, Inc. of Cleveland, Ohio. This model 88 pump also includes an integrated cylinder with the pump housing. In particular, the model 88 pump housing is fabricated from aluminum and includes an integrated cast iron sleeve to receive the movable piston. Other examples of lubricator pumps are the model 55 and 55i pumps manufactured by Lincoln Centralized Lubrication Systems, a Pentair Company, of St. Louis, Mo. The model 55 and 55i pumps feature a one-piece pump body with an integral cylinder. Both the model 88 pump and the assignee's device shown in FIG. 4 include an indicator port for communicating the piston chamber with the vacuum chamber in the sight glass assembly or sight well. This indicator port communicates lubricant slippage between the inner surface of the cylinder and the piston to the sight glass assembly. Above normal volume of lubricant in the sight glass assembly or variance in the volume in the sight glass assembly during operation of the pump indicates lubricant slippage in the cylinder piston assembly. The operator could then perform needed maintenance or, if needed, replacement of the entire pump housing if the cylinder piston assembly is found to be defective.

The model 88 pump and the model 55 and 55i pumps are available in a variety of piston sizes, e.g. ¼" and ⅜" to provide varied lubricant output. Because of the pump integrated cylinder, when a different size pump piston is desired by the operator, a new pump would be required.

It would be desirable to have a replaceable cylinder piston assembly for a pump housing of a lubricator. This replaceability of the cylinder piston assembly would allow interchangeability of different sizes of pump pistons to provide desired lubricant output. Additionally, a lubricator pump housing having a replaceable cylinder piston assembly would save on inventory costs, as a similar cylinder piston assembly could be replaced on a lubricator pump housing, eliminating the need, for these replacements, to stock complete pump housings or pumps. Additionally, a replaceable or removable cylinder piston assembly could reduce manufacturing costs since one of the critical areas of manufacture is the cylinder piston assembly. If a defective cylinder piston assembly were manufactured, only that assembly would need to be discarded, not the complete pump housing. Also, repair could be facilitated since a number of replacement cylinder piston assemblies with different piston sizes could be transported to field repair lubricators.

SUMMARY OF THE INVENTION

A lubricator for holding a lubricant is disclosed that includes a pump housing having a replaceable cylinder piston assembly. The pump housing includes an inlet and an outlet and a rocker arm removably attached to the pump housing. A vacuum chamber cooperates with the pump housing for receiving lubricant from the pump housing inlet.

The cylinder piston assembly includes a cylinder having an inner surface defining a piston chamber and an outer surface having a reduced diameter. The cylinder includes a port for communicating the piston chamber with the reduced diameter portion. A groove is positioned at one end of the reduced diameter portion to receive an o-ring.

This cylinder piston assembly is advantageously removable from the pump housing to allow replaceability and interchangeability with a cylinder piston assembly having pistons of different sizes and to repair the cylinder piston assembly.

BRIEF DESCRIPTION OF THE DRAWINGS

The objects, advantages, and features of the invention will become more apparent by reference to the drawings which are appended hereto and wherein like numerals indicate like parts and wherein an illustrated embodiment of the invention is shown, of which:

FIG. 5 is an elevational side view of the removable cylinder shown in FIG. 2.

DETAILED DESCRIPTION OF PREFERRED EMBODIMENT

Figure 2:
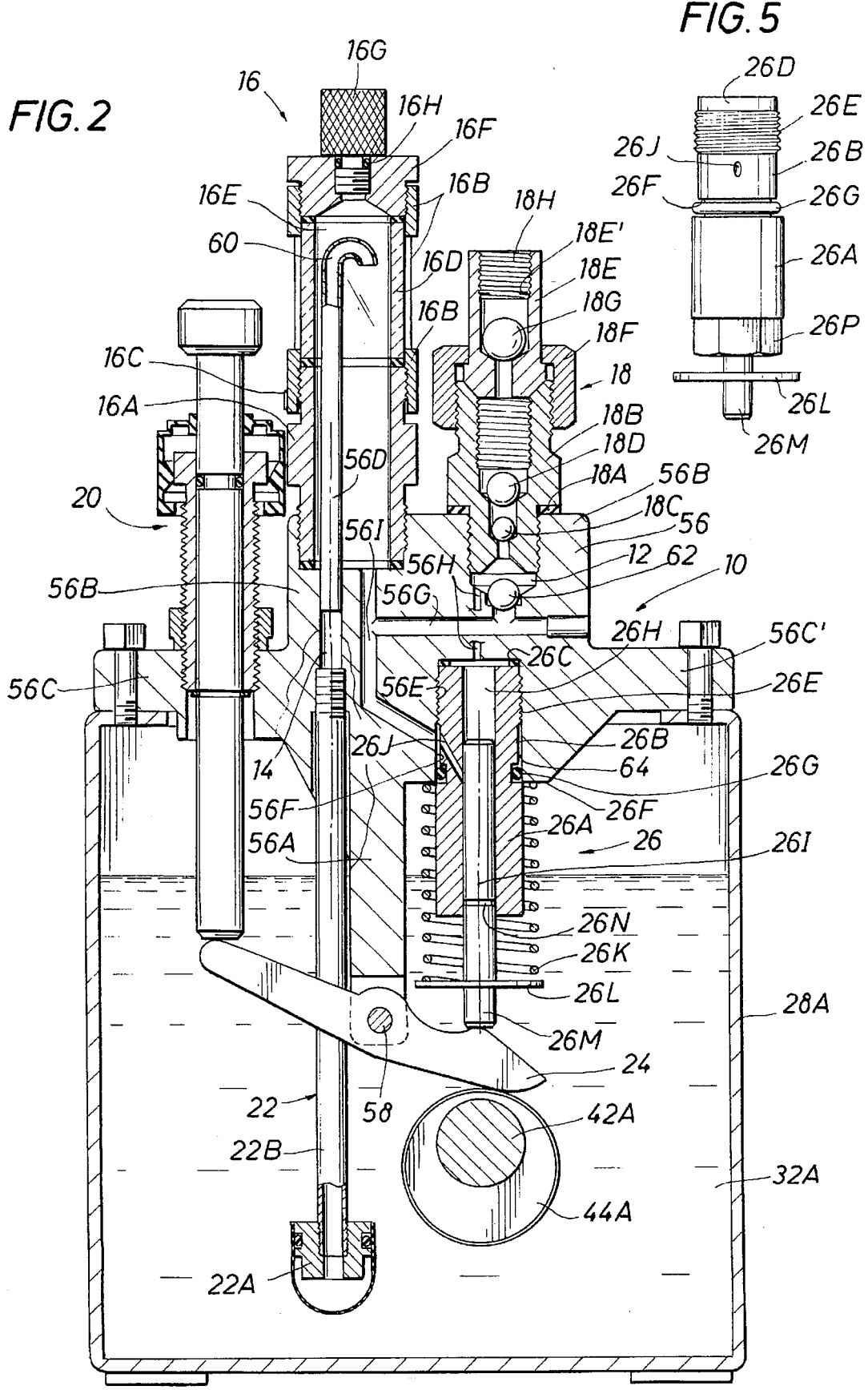
FIG. 2 is a section view taken along lines 2—2 of FIG. 1 showing a lubricator pump of the present invention with a replaceable cylinder piston assembly with the piston in the suction or cam down position.

While there are different varieties of force-feed lubricators used for lubricating injection points of machinery, a majority of the lubricators include a pump housing having an outlet 12 and an inlet 14; a sight glass assembly or sight well, generally indicated at 16; a discharge connector assembly, generally indicated at 18; a flushing unit assembly, generally indicated at 20; a suction tube and strainer assembly, generally indicated at 22; and a rocker arm 24 as best shown in FIG. 2. However, the present invention includes a cylinder piston assembly, generally indicated at 26, which will be discussed below in detail.

Figure 1:
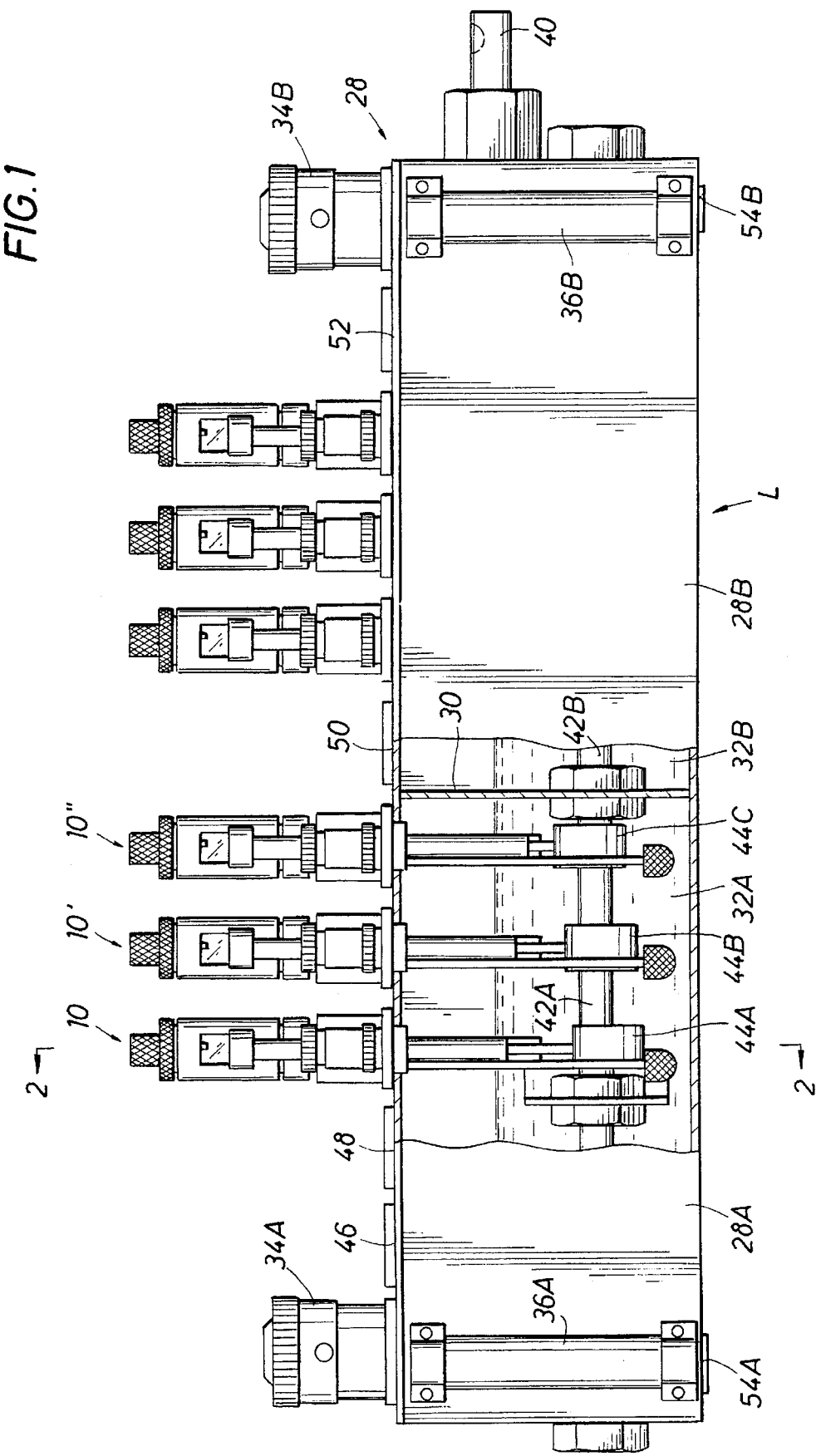
FIG. 1 is a side elevational view of a lubricator partially exposed to show a side view of three lubricator pumps of the present invention.

Turning to FIG. 1, an embodiment of a lubricator is generally indicated as L. This particular lubricator L includes a heavy duty steel reservoir 28 that includes a partition 30 to separate the lubricants 32A, 32B. Each portion of the reservoir 28A, 28B, defined in part by the partition, includes a respective filler assembly plate 34A, 34B and a see through gauge assembly 36A, 36B for the operator to determine the level of fluid within each portion of the reservoir 28A, 28B. Each filler assembly plate 34A, 34B is attached to the top of the reservoir by fastening members, such as screws (not shown).

The embodiment of the lubricator L shown in FIG. 1 includes a right-hand rotary drive 40. This rotary drive 40 turns the cam shaft assembly including shaft 42A, 42B and its cams 44A, 44B, 44C. In the disclosed embodiment of the lubricator L the cam shaft would include ten (10) cams, though only three are shown, and each partition of the reservoir has spaces for five pumps. For example, though the reservoir portion 28A includes pump 10, 10' and 10", additional pumps can be replaced in the reservoir for plates 46 and 48. Also, plates 50 and 52 in reservoir portion 28B can be replaced with pumps when desired. The lubricant 32A, 32B can be removed from the lubricator L by the respective drain plugs 54A, 54B. Lubricators also include peripheral devices such as automatic oil level controls, low level switches, electric heater and thermostat assemblies and could hold as few as one pump or as many as 40 pumps. Therefore, while the configuration of lubricators are variable, the pump configuration is generally standard and interchangeable with other lubricators.

Turning now to FIG. 2, the pump 10 includes a pump housing 56. The pump housing 56 of the present invention includes an integral elongated downwardly extending member 56A onto which the rocker arm 24 is movably connected by means of a clevis pin 58 and a cotter pin (not shown). The pump housing 56 also includes an upper housing block 56B for threadedly receiving the discharge connector assembly 18 and the sight glass assembly 16. The pump housing 56 further includes a flange 56C for receiving the flushing unit assembly 20. Flanges 56C and 56C' have holes for receiving bolts to attach the pump 10 to the reservoir 28A. The inlet 14 of the pump housing 56 threadedly receives the suction tube and strainer assembly 22 along its longitudinal axis 56D. A drip tube 60 is preferably threadedly received to the housing 56 along the longitudinal axis 56D for communicating the lubricant 32A from the reservoir 28A into the sight glass assembly 16.

The sight glass assembly 16 includes an extension 16A which is threadedly received into the upper housing block 56B. A sight glass housing 16B is threaded to the extension 16A and is prevented from inadvertent rotation by use of a sight glass housing lock screw 16C. A sight glass 16D, preferably made of "PYREX" glass, allows visual inspection inside the sight glass assembly 16 to the vacuum chamber 16E. An upper sight glass retainer 16F is threadedly received into the sight glass housing 16B. A knurled vent screw 16G having a vent screw o-ring 16H provides a sealed sight glass assembly 16 with the only opening to the lubricant 32A being via the drip tube 60, the suction tube strainer body 22A and the suction tube 22B of the suction tube and strainer assembly 22.

The discharge connector assembly 18 includes a connector seal washer 18A for sealing the connector assembly 18 with the upper block 56B of the pump housing 56. The discharge connector assembly 18 is threadedly received to the housing 56 to communicate with the pump housing outlet 12. A member 18B includes a first smaller ball valve 18C and a second larger ball valve 18D. A union sleeve 18E is connected to the member 18B by use of a union nut 18F. A third larger ball valve 18G is held in the union sleeve 18E by a ring 18E threadedly received in sleeve 18E. A flow check ball valve 62 is provided in the pump housing outlet 12, as will be described in detail below. This flow check ball 62 can be made from carbon steel or stainless steel.

According to the present invention, as defined herein, the cylinder piston assembly 26 includes a cylinder 26A having a reduced diameter portion 26B and a piston 26M. A cylinder seal washer 26C is provided between the cylinder piston assembly 26 and the pump housing 56 to provide a high pressure seal. Preferably, this washer 26C is fabricated from aluminum. As best shown in FIG. 5, a cylindrical portion 26D of the cylinder piston assembly is positioned at one end of the assembly 26 to ensure positive engagement of the washer 26C with the pump housing 56. A connection means, such as thread 26E on the outer surface of the cylinder 26A engages the corresponding internally threaded bore 56E of the pump housing 56. The reduced diameter portion 26B is located between a groove 26F and the threaded member 26E. An elastomer, preferably an o-ring 26G, is received in the groove 26F. An annulus 64 is defined by the reduced diameter portion 26B of the outer surface of the cylinder 26A and the cylindrical section 56F of the pump housing. The lower portion of the annulus 64 is sealed by the o-ring 26G. The upper end of the annulus is sealed by the washer 26C alone or in combination with the metal to metal seal provided by the threaded members 26E and 56E.

A piston chamber 26H is defined by the inner surface of the cylinder 26A. The longitudinal axis of both the piston chamber 26H and the piston 26M is indicated at 26I, which axis is preferably parallel to the inlet axis 56D. An indicator port 26J communicates the piston chamber 26H with the annulus 64. Because of this cooperation of the port 26J with the annulus 64, when the cylinder piston assembly 26 is threaded into the pump housing 56 the alignment of the indicator port 26I is not critical.

An urging member, preferably a coil spring 26K, is received about the outer surface of the cylinder 26A. One end of the coil spring 26K is attached to retainer plate 26L that is received about a slot in the piston 26M. In particular, the spring retainer 26L has a U-shaped opening received about a groove in the piston, similar to the piston groove 26N.

When the cam 44A on the shaft 42A rotates, it engages one end of the rocker arm 24. FIG. 2 illustrates a cylinder piston assembly 26 having a ⅜ inch piston that pumps to 3500 psi (0.041 inch$^3$ per stroke max). FIG. 5 further illustrates the flats 26P of the cylinder piston assembly 26. These flats are designed to facilitate the removal of the cylinder piston assembly 26 by means of a wrench or other suitable tool. In FIG. 2 the cam with the engaged rocker arm is shown in the down position. In this position, the piston 26M is urged by spring 26K to the suction position.

Figure 3:
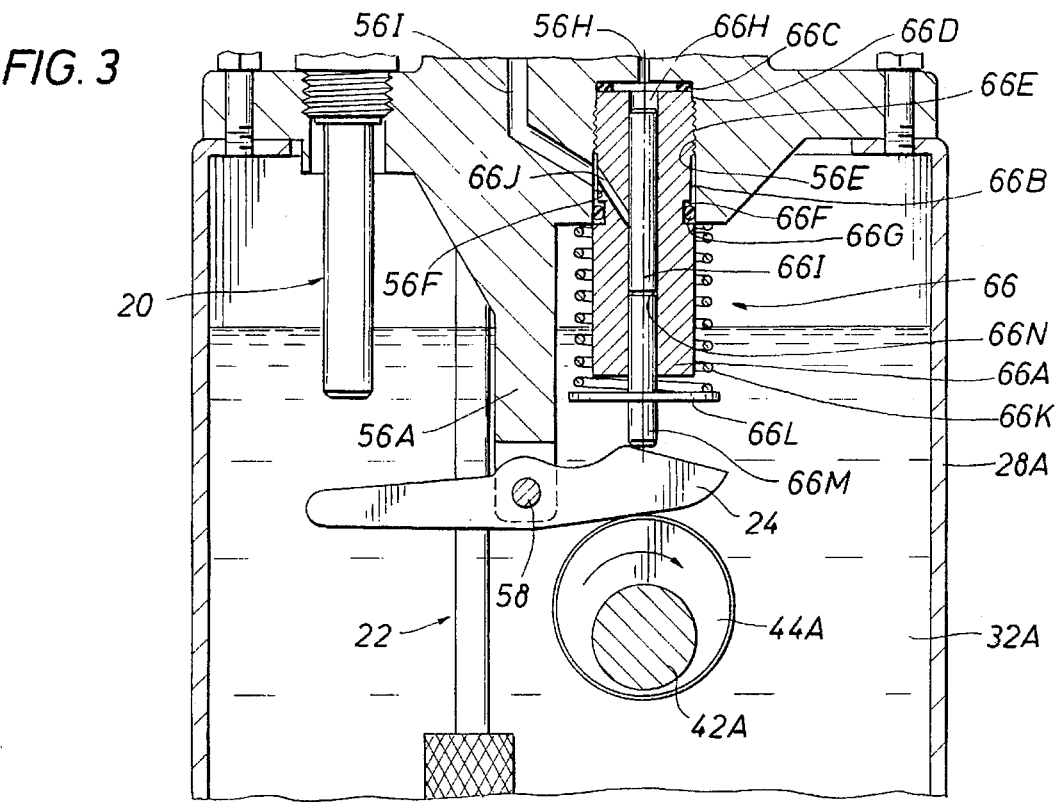
FIG. 3 is a view similar to the lower portion of FIG. 2 showing an interchangeable cylinder piston assembly, with a smaller piston than the piston in FIG. 2, in the discharge or cam up position.
Figure 4:
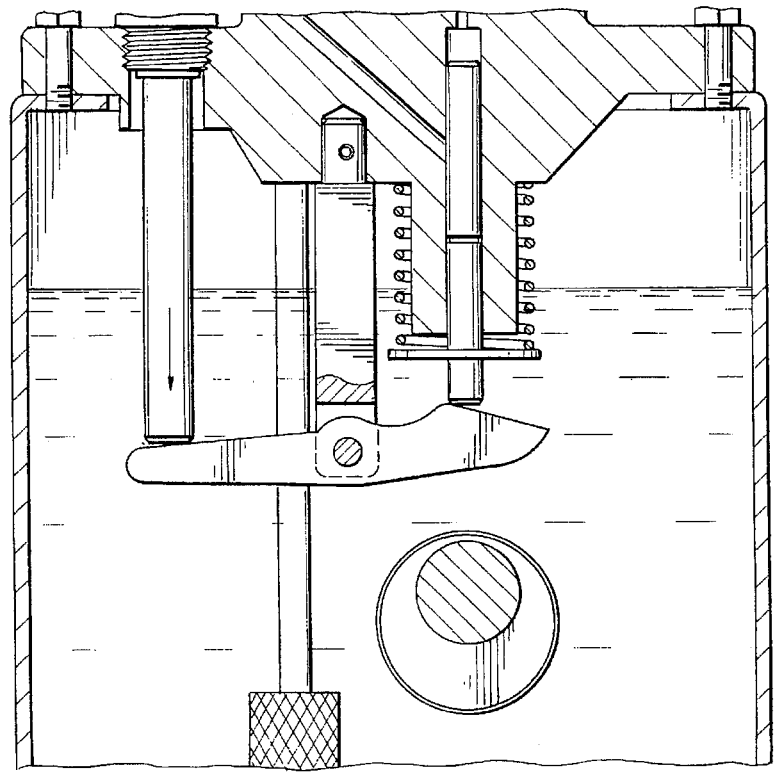
FIG. 4 is a view similar to FIG. 3 showing a prior art device where the cylinder is integral with the pump housing and the elongated member extending along side the cylinder is pinned to the pump housing.

Turning now to FIG. 3, a cylinder piston assembly, generally indicated as 66, is shown replacing the cylinder piston assembly 26. The cylinder piston assembly 66 has similar components as cylinder piston assembly 26, except the inner surface of the cylinder 66A is sized to receive a ¼ inch piston that now is rated for pumping up to 8000 psi (0.018 inch$^3$ per stroke max). Similar components of assembly 66 include similar alphabetic references of assembly 26 in FIG. 2. In FIG. 3, the piston 66M is shown in the discharge position, as the rocker arm 24 has been moved upwardly by the cam 44A. Returning to FIG. 2, the sight glass assembly 16, discharge connector assembly 18 and the cylinder piston assembly 26 are connected via passages in the pump housing 56. In particular, an indicator passage 56I is provided between the annulus 64, as shown in FIG. 2, to the sight glass assembly 16. Passage 56G communicates the outlet 12 with the vacuum chamber 16E of the sight glass assembly 16. Passage 56H, shown in broken view, communicates the pump housing outlet 12 with the piston chamber 26H, as will be further described below.

Use and Operation

Upon rotation of the cam 44A the piston moves to its suction or down position, as shown in FIG. 2. This downward stroke causes the discharge valve balls 18C, 18D and 18G to seal with the discharge connector assembly 18, as shown in FIG. 2. This suction in passage 56H causes the valve ball 62 to be suspended in the pump housing outlet 12 so that lubricant is pulled from the vacuum chamber 16E of the sight glass assembly 16 via passages 56G and 56H into the piston chamber 26H. This suction of the lubricant from the vacuum chamber 16E in turn creates a low pressure in the vacuum chamber 16E which causes lubricant to be drawn up through the suction tube and strainer assembly 22 into the pump housing inlet 14 and through the drip tube 60. This lubricant falls as drops from the drip tube 60 which can be observed by the operator through the glass 16D of the sight glass assembly 16 and counted, if desired, to determine the rate of flow. On the upstroke of the piston to its discharge position, such as shown in FIG. 3, the piston via the piston chamber and passage 56H forces the valve ball 62 to seal with the pump housing outlet while suspending the valve balls 18C, 18D and 18G to allow lubricant to flow out the discharge connector assembly outlet 18H.

Advantageously, the cylinder piston assembly can be removed from the pump housing 56 by releasing the spring retainer from the groove in the piston and removing the coil spring from around the cylinder piston assembly. A wrench is then positioned with the flats on the outer surface of the cylinder and rotated to unthread the cylinder from the threaded bore 56E of the pump housing 56. A similar piston assembly can be replaced or a cylinder piston assembly having a different piston size can be attached with the same pump housing 56. In attaching the cylinder piston assembly the wrench is positioned on the flats of the cylinder to properly torque the aluminum washer between the pump housing and the cylinder. The coil spring is then positioned about the outer surface of the cylinder and the spring retainer is positioned in the groove in the piston.

As seen in FIGS. 2, 3 and 5 the cylinder piston assembly includes an indicator port. As previously described, when the inner surface of the cylinder and the piston allows lubricant slippage the lubricant flows through the indicator port to the annulus. The lubricant slippage is then forced through the indicator passage 56I into the vacuum chamber 16E of the sight glass assembly 16. Accumulation of this lubricant slippage increases the volume of lubricant in the vacuum chamber of the sight glass assembly which can be observed by the operator by visual inspection through the glass of the sight glass assembly. Also, abnormal variances in the volume of the lubricant in the vacuum chamber could also be observed by the operator indicating a need for replacement of the existing cylinder piston assembly.

The foregoing disclosure and description of the invention are illustrative and explanatory thereof, and various changes in the size, shape, and materials, as well as in the details of the illustrated construction may be made without departing from the spirit of the invention.

What is claimed is:

1. Apparatus for use with a lubricator holding a lubricant comprising
   a pump housing having an inlet and an outlet;
   a rocker arm movably attached to said pump housing;
   a sight glass assembly having a vacuum chamber and cooperating with said pump housing for receiving lubricant from said pump housing inlet;
   a cylinder having a piston chamber; said cylinder being removably attached to said pump housing;
   a piston slidably engaged with said piston chamber between a suction position and a discharge position to move lubricant from said vacuum chamber to said pump housing outlet;
   an annulus defined by said cylinder and said pump housing;
   a port disposed in said cylinder for communicating said piston chamber with said annulus; and
   an indicator passage disposed in said pump housing for communicating said annulus with said vacuum chamber to indicate lubricant slippage.

2. Apparatus of claim 1 wherein said pump housing inlet having a longitudinal axis and said piston having a longitudinal axis, said piston axis is parallel to said inlet axis.

3. Apparatus of claim 1 further comprising said cylinder having an external threaded member wherein said pump housing includes a threaded bore to receive said cylinder external threaded member.

4. Apparatus of claim 1 wherein said cylinder having an inner surface and an outer surface, said cylinder inner surface defining said piston chamber; and
   said port and said indicator passage communicating said piston chamber to said vacuum chamber.

5. Apparatus of claim 4 further comprising a pump housing bore wherein a reduced diameter portion of said cylinder outer surface and said pump housing bore defining said annulus.

6. Apparatus of claim 5 further comprising an elastomer for sealing one end of said annulus.

7. Apparatus of claim 1 further comprising a second cylinder having a piston wherein said second cylinder piston is of a different size than said cylinder piston and said second cylinder is interchangeable with said cylinder in said pump housing.

8. Apparatus for use with a lubricator pump housing comprising
   a cylinder having a piston chamber, said cylinder having an inner surface and an outer surface, said cylinder outer surface having a reduced diameter portion, said reduced diameter portion having a thread on one end and a groove on the other end,
   said cylinder inner surface defining said piston chamber,
   said cylinder having a port for communicating said piston chamber with said reduced diameter portion;
   a piston disposed in said piston chamber to provide sliding engagement with said cylinder inner surface about said port; and
   flats disposed on said cylinder outer surface, said port disposed between said thread and said flats.

9. Apparatus of claim 8 wherein an elastomer is received in said groove.

10. Apparatus of claim 8 wherein a portion of said piston covers said port when said piston moves in said piston chamber.

11. Apparatus of claim 8 further comprising an urging member for urging said piston from said cylinder.

12. Apparatus of claim 11 wherein said urging member comprises a coil spring received about a portion of said cylinder outer surface.

13. Apparatus of claim 12 wherein one end of said coil spring receiving a spring retainer, said spring retainer being attached to said piston.

14. Apparatus of claim 8 further comprising an elastomer, said elastomer positioned around said cylinder outer surface between said port and said flats.

15. Apparatus for use with a lubricator pump housing comprising a cylinder having an inner surface and an outer surface, said cylinder outer surface having a reduced diameter portion and a groove, said cylinder inner surface defining a piston chamber;

a piston movably positioned in said piston chamber for providing a slidable seal between said piston and said cylinder inner surface;

a thread being positioned on said cylinder outer surface;

said cylinder having a port for communicating said piston chamber with said cylinder reduced diameter portion, said piston moving relative to said cylinder inner surface about said port to seal said port with said piston;

said reduced diameter portion is positioned between said thread and said groove; and an elastomer is received in said groove.

16. Apparatus for use with a lubricator holding a lubricant comprising a pump housing having an inlet and an outlet;

a sight glass assembly having a chamber and cooperating with said pump housing for receiving lubricant from said pump housing inlet;

a first cylinder having a first piston chamber; said first cylinder being removably attached to said pump housing;

said first cylinder having an inner surface and an outer surface, said first cylinder outer surface having a reduced diameter portion, said reduced diameter portion having a thread on one end and a groove on the other end, said first cylinder inner surface defining said first piston chamber, said first cylinder having a port for communicating said first piston chamber with said reduced diameter portion;

flats disposed on said first cylinder outer surface, said port disposed between said thread and said flats;

a first piston having a diameter and moving in said first piston chamber about said port between a suction position and a discharge position to move lubricant from said chamber to said pump housing outlet;

a second cylinder having a second piston chamber; said second cylinder is interchangeable with said first cylinder in said pump housing; and a second piston having a diameter and moving in said second piston chamber between a suction position and a discharge position, said second piston is of a different diameter than said first piston diameter to provide a different pump rate.

17. Apparatus for use with a lubricant comprising a pump housing having an inlet and an outlet;

a rocker arm movably attached to said pump housing;

a first cylinder having a first piston chamber; said first cylinder being removably attached to said pump housing;

said first cylinder having an inner surface and an outer surface, said first cylinder outer surface having a reduced diameter portion, said reduced diameter portion having a thread on one end and a groove on the other end, said first cylinder inner surface defining said first piston chamber, said first cylinder having a port for communicating said first piston chamber with said reduced diameter portion;

flats disposed on said first cylinder outer surface, said port disposed between said thread and said flats;

a first piston having a diameter and moving in said first piston chamber about said port between a suction position and a discharge position to move lubricant from said pump housing inlet to said pump housing outlet;

a second cylinder having a second piston chamber; said second cylinder is interchangeable with said first cylinder in said pump housing; and a second piston having a diameter and moving in said second piston chamber between a suction position and a discharge position, said second piston is of a different diameter than said first piston diameter to provide a different pump rate.

18. Apparatus for use with a lubricant comprising a pump housing having an inlet and an outlet;

a rocker arm movably attached to said pump housing;

a cylinder having a piston chamber; said cylinder being removably attached to said pump housing;

a piston slidingly engaged with said piston chamber between a suction position and a discharge position to move lubricant from said pump housing inlet to said pump housing outlet;

an annulus defined by said cylinder and said pump housing;

a port disposed in said cylinder for communicating said piston chamber with said annulus; and an indicator passage disposed in said pump housing for communicating said annulus with said pump housing inlet.

\* \* \* \* \*